US012338064B1

(12) United States Patent
Baker

(10) Patent No.: US 12,338,064 B1
(45) Date of Patent: Jun. 24, 2025

(54) DEVICE AND METHOD FOR COLLECTING DEBRIS

(71) Applicant: Gary Baker, Bellingham, MA (US)

(72) Inventor: Gary Baker, Bellingham, MA (US)

( * ) Notice: Subject to any disclaimer, the term of this patent is extended or adjusted under 35 U.S.C. 154(b) by 0 days.

(21) Appl. No.: 18/199,406

(22) Filed: May 19, 2023

Related U.S. Application Data

(60) Provisional application No. 63/343,708, filed on May 19, 2022.

(51) Int. Cl.
*B65F 1/02* (2006.01)
*B65F 1/14* (2006.01)

(52) U.S. Cl.
CPC .............. *B65F 1/02* (2013.01); *B65F 1/1473* (2013.01); *B65F 2220/1063* (2013.01); *B65F 2240/138* (2013.01)

(58) Field of Classification Search
CPC .. B65F 1/02; B65F 1/1473; B65F 2220/1063; B65F 2240/138; B65D 29/04; B65D 88/1662; B65D 90/20; B65D 2571/00691
See application file for complete search history.

(56) References Cited

U.S. PATENT DOCUMENTS 4,366,949 A 1/1983 Staub
4,602,664 A 7/1986 Hullen
5,011,103 A * 4/1991 Hayes ................ B65B 67/1255 383/33
5,031,277 A * 7/1991 Coker .................. B65F 1/1468 15/257.3
5,393,022 A * 2/1995 Palumbo ................ B65B 67/12 248/95
5,524,423 A 6/1996 Haley
5,579,610 A 12/1996 Jackson
5,593,117 A * 1/1997 Alexander, III ...... B65F 1/1415 383/33
5,664,886 A 9/1997 Hutchinson
7,490,787 B1 * 2/2009 Salazar ..................... B65F 1/10 241/285.2
8,882,350 B2 * 11/2014 Cheney ..................... B65F 1/10 383/102
9,409,666 B1 * 8/2016 Staten ................ B65B 67/1238
2004/0139713 A1 7/2004 Ng
2005/0011997 A1 * 1/2005 Kalal ...................... B65B 67/04 248/101
2005/0120692 A1 6/2005 Kim
2006/0018568 A1 1/2006 Costello
2007/0095419 A1 * 5/2007 Campbell ............ B65F 1/1415 141/10
2007/0138453 A1 6/2007 Le
(Continued)

*Primary Examiner* — Kareen K Thomas
(74) *Attorney, Agent, or Firm* — John Rizvi; John Rizvi, P.A.—The Patent Professor®

(57) ABSTRACT

A device for collecting debris comprises a frame having elongated members coupled to define therebetween left and right sides, an upper side, and a lower side. The left and right sides are opposite each other and the upper and lower sides extend between the left and right sides. The device includes a net coupled to the frame and covering the left side, the right side, the upper side, and the lower side. The net and the frame in combination define an enclosure between the left side, the right side, the upper side, and the lower side with an opening that provides access to the enclosure between ends of the left and right sides.

20 Claims, 15 Drawing Sheets

(56) References Cited

U.S. PATENT DOCUMENTS

| | | | | |
|---|---|---|---|---|
| 2011/0041954 A1* | 2/2011 | Noonan | B65F 1/10 | 141/316 |
| 2011/0277883 A1* | 11/2011 | Noonan | B65F 1/00 | 29/428 |
| 2015/0048128 A1* | 2/2015 | Bethel, Jr. | B60P 1/283 | 224/404 |

* cited by examiner

DEVICE AND METHOD FOR COLLECTING DEBRIS

CROSS-REFERENCE TO RELATED APPLICATION

This application claims the benefit of U.S. Provisional Patent Application No. 63/343,708, filed on May 19, 2022, which is incorporated by reference herein in its entirety.

FIELD OF THE INVENTION

The present invention relates generally to devices for collecting debris, such as fallen leaves and other plant debris on a lawn, and more particularly, to a device that includes a net and a frame for supporting the net in a manner that allows debris to be collected within an enclosure defined thereby.

BACKGROUND OF THE INVENTION

It is well known that accumulation of plant debris, such as leaves fallen from trees, on a property may hinder plant growth and/or may result in a poor aesthetic appearance. However, collection of plant debris can be a time-consuming burdensome task, especially for properties with many deciduous trees.

For example, removal of fallen leaves from a lawn often involves aggregating the leaves using a rake or leaf blower followed by collection for disposal. The leaves may be aggregated into piles on the ground, or onto a collection device such as a cloth, tarp, or net, and subsequently hauled to a removal site (e.g., a curb or a city dump). In each of these instances, a strong wind may periodically or continuously blow the pile of leaves across the property during the collection process thereby frustrating or thwarting the collection of the leaves.

Various attempts have been made to address this issue. For example, stakes or other devices may be used to support a collection device (e.g., a cloth, tarp, and/or net) or a portion thereof to provide a temporary barrier adjacent the pile of leaves. However, this approach requires securing the stakes to the ground, securing the collection device to the stakes, collecting the leaves and, once collected, decoupling the collection device from the stakes. If leaves are to be collected in more than one location on the property, it may be necessary to repeat this process. In addition, this solution does not prevent the wind from blowing the leaves in directions away from the staked portion of the collection device, or from blowing over the collection device.

Some collection devices include fastener systems or the like that allow the collection device to cover the leaves and be secured in such arrangement to thereby prevent the leaves from blowing in the wind. However, these fastener systems may only be used after aggregation of the leaves, rather than during the collection process.

Accordingly, there is an established need for a solution to at least one of the aforementioned problems. For example, there remains a need for a device capable of promoting neat, quick, and efficient collection of debris, such as fallen leaves, in a manner that reduces the likelihood of the debris being dispersed by the wind during the collection process.

SUMMARY OF THE INVENTION

The present invention is directed to a convenient and labor-saving device that is capable of promoting neat, quick, and efficient collection of debris, such as fallen leaves, in a manner that reduces the likelihood of the debris being dispersed by the wind during the collection process. The device may include a frame having elongated members coupled to define therebetween left and right sides, an upper side, and a lower side. The left and right sides are opposite each other and the upper and lower sides extend between the left and right sides. The device includes a net coupled to the frame and covering the left side, the right side, the upper side, and the lower side. The net and the frame in combination define an enclosure between the left side, the right side, the upper side, and the lower side with an opening that provides access to the enclosure between ends of the left and right sides.

In a first implementation of the invention, a device for collecting debris comprises a frame having elongated members coupled to define therebetween left and right sides, an upper side, and a lower side. The left and right sides are opposite each other and the upper and lower sides extend between the left and right sides. The device includes a net coupled to the frame and covering the left side, the right side, the upper side, and the lower side. The net and the frame in combination define an enclosure between the left side, the right side, the upper side, and the lower side with an opening that provides access to the enclosure between ends of the left and right sides.

In a second aspect, the left and right sides may have triangular shapes.

In another aspect, the upper and lower sides may have isosceles trapezoidal shapes.

In another aspect, the frame may be configured to collapse such that portions of the net covering the upper and lower sides are substantially in contact with each other.

In another aspect, the elongated members defining each of the left and right sides may include a pair of rigid members pivotally coupled relative to each other at first ends of the rigid members and pivotally coupled to opposite ends of a front member as second ends of the rigid members.

In another aspect, the elongated members may include a crossbar extending between and coupling the left and right sides.

In another aspect, the front members may each include a pair of partial members pivotally coupled to each other and configured to pivot relative to each other and relative to the respective second ends of the rigid members such that the front members collapse into the respective left and right sides thereby decreasing areas defining the left and right sides.

In another aspect, the net may be configured to retain leaves within the enclosure.

In another aspect, the device may be configured to allow selectively sealing of the opening to the enclosure.

In another aspect, the elongated members may be formed of a fiberglass material.

In another aspect, a method of collecting debris distributed on a surface comprises providing a device that includes a frame having elongated members coupled to define therebetween left and right sides, an upper side, and a lower side, wherein the left and right sides are opposite each other and the upper and lower sides extend between the left and right sides, and a net coupled to the frame and covering the left side, the right side, the upper side, and the lower side, wherein the net and the frame in combination define an enclosure between the left side, the right side, the upper side, and the lower side with an opening that provides access to the enclosure between ends of the left and right sides. The method includes locating the device in a first position on the surface such that the lower side is adjacent the surface and the upper side is supported in an elevated position above the surface by the left and right sides and moving the debris in a direction toward the device such that the debris are received through the opening and into the enclosure.

In another aspect, the method may include relocating the device to a second position on the surface with the debris retained within the enclosure and moving additional debris in a direction toward the device such that the debris are received through the opening and into the enclosure.

In another aspect, the method may include sealing the opening of the device with the debris retained within the enclosure.

In another aspect, the method may include collapsing the frame such that portions of the net covering the upper and lower sides are substantially in contact with each other.

In another aspect, the elongated members defining each of the left and right sides may include upper and lower members pivotally coupled relative to each other at first ends thereof and each independently pivotally coupled to corresponding opposite ends of a front member as second ends of the upper and lower members, and the method step of collapsing the frame may include pivoting the upper and lower members of each of the left and right sides relative to each other and pivoting the front members of each of the left and right sides relative to the upper and/or lower members of the corresponding left and right sides.

In another aspect, the front members may each include a pair of partial members pivotally coupled to each other and the method step of collapsing the frame includes pivoting the partial members of each of the left and right sides relative to each other and relative to the respective second ends of the rigid members such that the front members collapse into the respective left and right sides thereby decreasing areas defining the left and right sides.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a convenient and economical device that is capable of receiving and retaining debris within an enclosure thereof in an efficient, neat, and tidy manner thereby promoting ease of collection the debris. In some examples, the debris may include loose leaves shed from plants.

Figure 1:
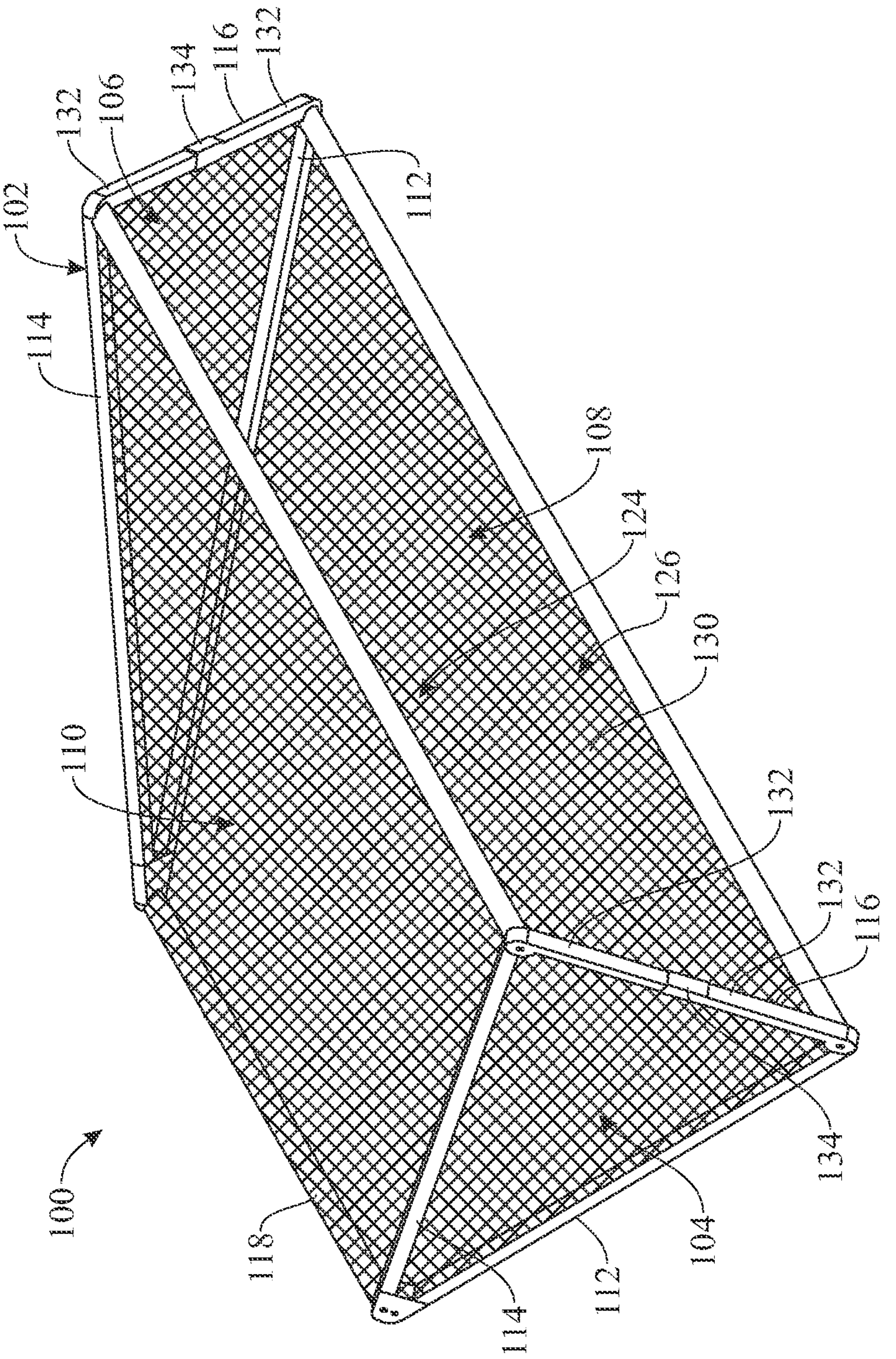
FIG. 1 presents a top, front perspective view of a device for collecting debris in accordance with a first embodiment of the present invention.
Figure 2:
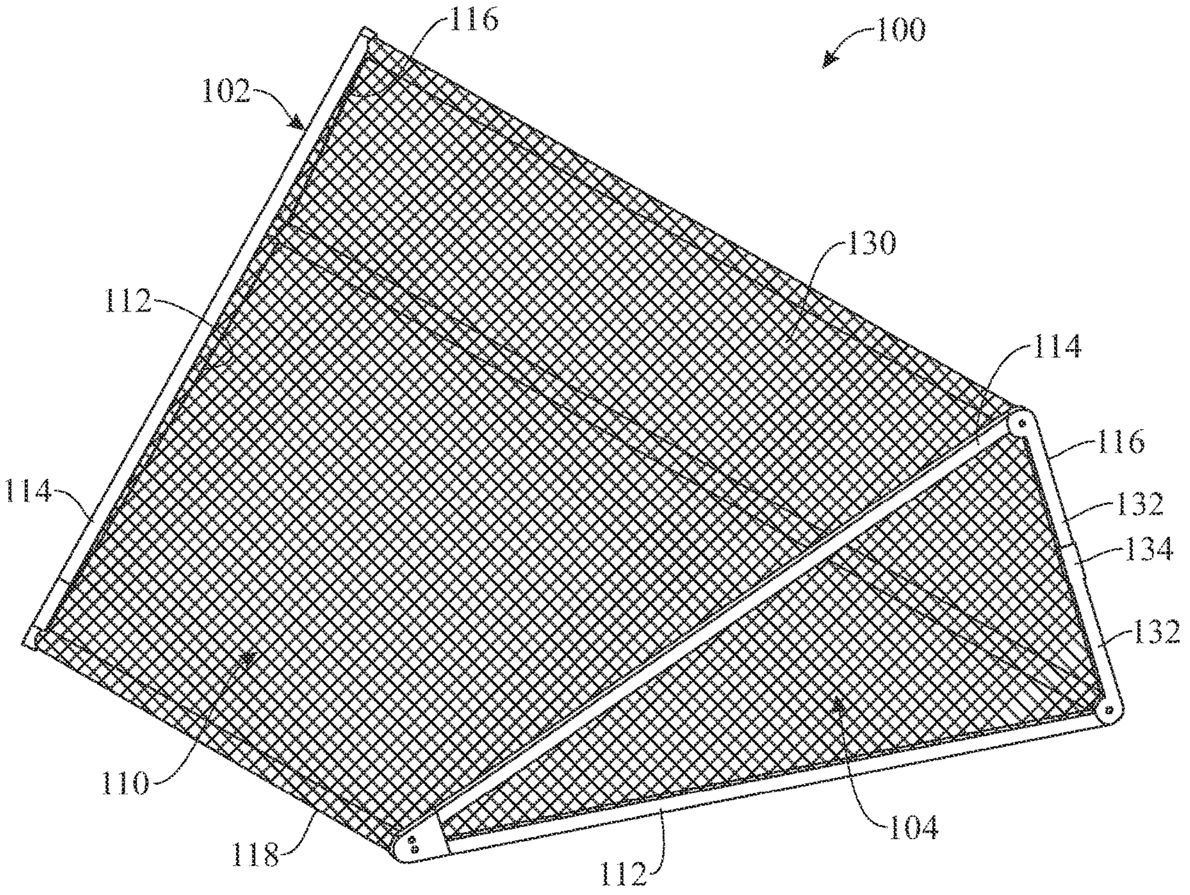
FIG. 2 presents a top, rear perspective view of the device of FIG. 1.

Referring initially to FIGS. 1 and 2, a nonlimiting embodiment of the device, referred to herein as the device 100, is presented, that is capable of use in collecting debris, such as leaves on a lawn. The device 100 includes a frame 102 having elongated members coupled in a manner as to define therebetween a left section or side 104, a right section or side 106, an upper section or side 110, and a lower section or side 108. The left and right sides 104 and 106 are opposite each other and the lower and upper sides 108 and 110 extend between the left and right sides 104 and 106. In this example, the left and right sides 104 and 106 have triangular shapes, and the lower and upper sides 108 and 110 have isosceles trapezoidal shapes. However, the left and right sides 104 and 106, the upper side 110, and the lower side 108 may have other shapes, for example, rectangular. In some examples, the elongated members of the frame 102 may define additional or fewer sections than those described above and presented in the figures.

In this example, the elongated members defining each of the left and right sides 104 and 106 include a pair of rigid members, referred to as a lower member 112 and an upper member 114, pivotally coupled relative to each other at rear or first ends thereof. A front member 116 extends between and is coupled at opposite ends thereof to front or second ends of the lower and upper members 112 and 114. A rear crossbar 118 extends between and couples the left and right sides 104 and 106. In this example, the rear crossbar 118 extends between a connection between the rear or first ends of the lower and upper members 112 and 114 of the left and right sides 104 and 106. In some embodiments, additional crossbars may extend between and couple to the front or second ends of the lower and upper members 112 and 114 of the left and right sides 104 and 106 and/or the front member 116. For example, as shown, the present embodiment includes a front lower crossbar 120 and a front upper crossbar 122. The front lower crossbar 120 extends between and couples to a connection between the front or second end of the lower member 112 and a lower end of the front member 116 of the left side 104, and a connection between the front or second end of the lower member 112 and a lower end of the front member 116 of the right side 106. The front upper crossbar 122 extends between and couples to a connection between the front or second end of the upper member 114 and an upper end of the front member 116 of the left side 104, and a connection between the front or second end of the upper member 114 and an upper end of the front member 116 of the right side 106.

The elongated members may have various dimensions, cross-sectional shapes, and longitudinal shapes. In this example, the elongated members are presented as elongated, linear members having rectangular cross-sectional profiles. The elongated members may be formed of various materials, including certain polymeric, ceramic, metallic, and/or composite materials. In some examples, one or more of the elongated members and/or connections, hinges, and/or joints therebetween may be formed of a fiberglass composite material. In other examples, one or more of the elongated members and/or connections, hinges, and/or joints therebetween may be formed of aluminum or an aluminum alloy. In yet other examples, one or more of the elongated members and/or connections, hinges, and/or joints therebetween may be formed of a polymeric material such as polyvinyl chloride (PVC), high-density polyethylene (HDPE), or polypropylene (PP). In certain examples, the elongated members may have a coating thereon, for example, for corrosion resistance, increased durability, and/or aesthetics.

The device 100 includes a net 130 coupled to the frame 102 and covering the left side 104, the right side 106, the upper side 110, and the lower side 108. In combination, the net 130 and the frame 102 form an enclosure having an interior space 124. An opening 126 provides access to the interior space 124 between ends of the left and right sides 104 and 106. For convenience, the device 100 will be referred to as having a front and a rear, wherein the opening 126 is adjacent the front of the device 100 and the rear is opposite the front adjacent the rear crossbar 118. In some examples, the device 100 may be configured to allow the opening 126 to be partially or entirely covered or sealed. For example, the net 130 may be configured to cover the opening 126 and releasably seal the opening 126 via fasteners (e.g., hook-and-loop fasteners or zippers). In certain examples, one or more of the elongated members may be entirely or partially within a sleeve secured to the net 130. In some examples, the elongated members may be releasably received within sleeves (e.g., with a hook-and-loop fasteners) in a manner that allows the net 130 to be decoupled from the frame 102.

The net 130 may include a woven or nonwoven mesh material having a plurality of interconnected strands that define voids therebetween. The stands may have various thicknesses and lengths, and the voids defined thereby may have various sizes and shapes. In some examples, the voids defined by the strands have a size sufficiently small such that certain debris, such as fallen leaves, are substantially impeded from passing therethrough while simultaneously sufficiently large such that air and/or other smaller debris are allowed to pass therethrough. In some examples, the net 130 is flexible. The net 130 may be formed of various materials, including certain braided or non-braided natural and/or synthetic fiber materials, and certain polymeric materials. Intersections between the strands may be integral, fused, looped, or knotted. In certain examples, the net 130 is formed of a polymeric material such as polypropylene (PP), polyethylene (PE), nylon, polyvinyl chloride (PVC), or polytetrafluoroethylene (PTFE). In some examples, the net 130 may have a coating deposited thereon, for example, for waterproofing and/or increased durability.

Figure 6:
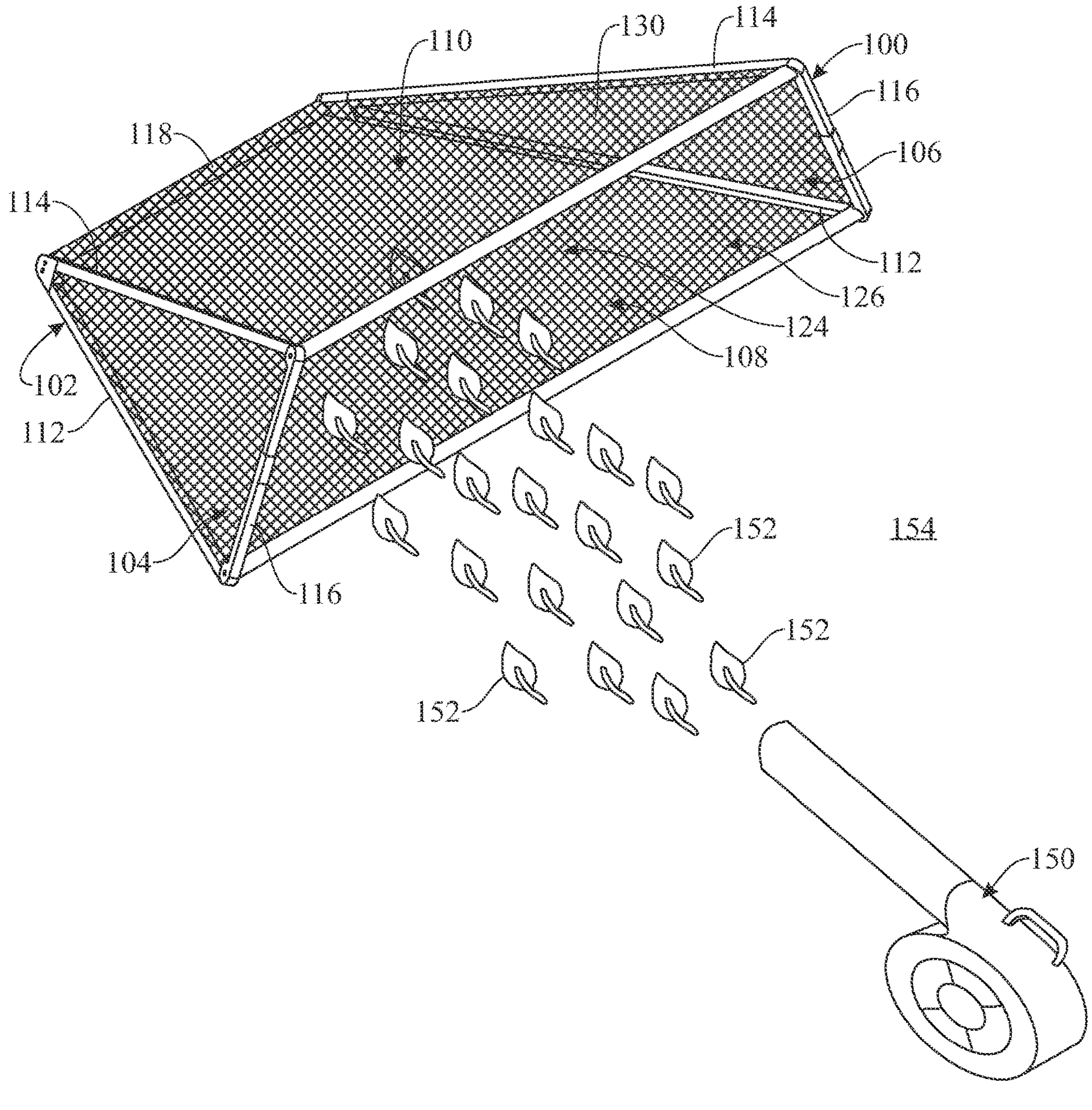
FIG. 6 presents a top, front perspective view of the device of FIG. 1, showing a nonlimiting method of collecting fallen leaves therewith in accordance with an illustrative embodiment of the invention.

During use of the device 100 to collect debris, portions of the frame 102 that define the lower side 108 may be located on a surface, such as a lawn, with the upper side 110 supported in an elevated position above the surface by the left and right sides 104 and 106 of the frame 102. With the device 100 oriented in this position, debris (e.g., leaves) may be directed toward the opening 126 to be received within the interior space 124 and retained therein by the net 130 (provided that the debris is larger than the voids of the net 130). The illustration of FIG. 6 shows a leaf blower 150 expelling a flow of air to propel leaves 152 on a lawn 154 toward the opening 126 of the device 100. In such example, the leaves 152 may be collected within the interior space 124, retained therein by the net 130, and subsequently removed for disposal.

Figure 3:
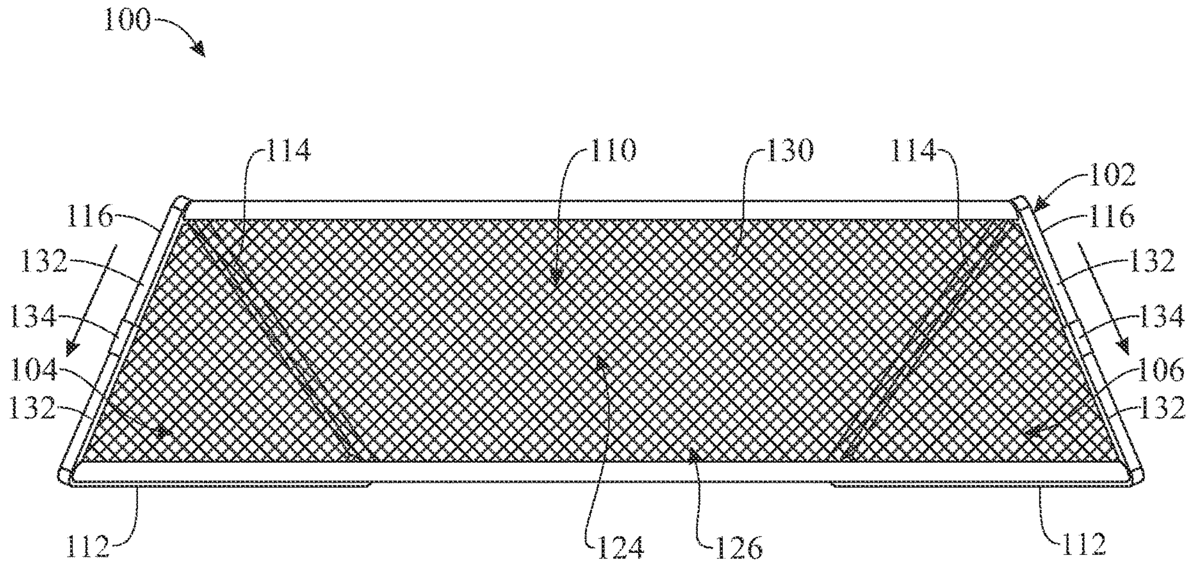
FIG. 3 presents a front elevation view of the device of FIG. 1 and illustrates a method of collapsing the device in accordance with a nonlimiting aspect of the invention.
Figure 4:
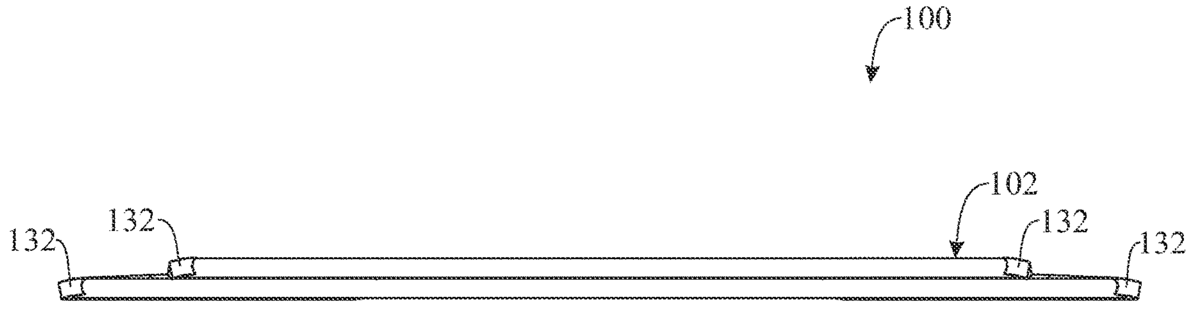
FIG. 4 presents a front elevation view, further to FIG. 3, illustrating the device in a collapsed configuration after collapsing the device in accordance with a nonlimiting aspect of the invention.
Figure 5:
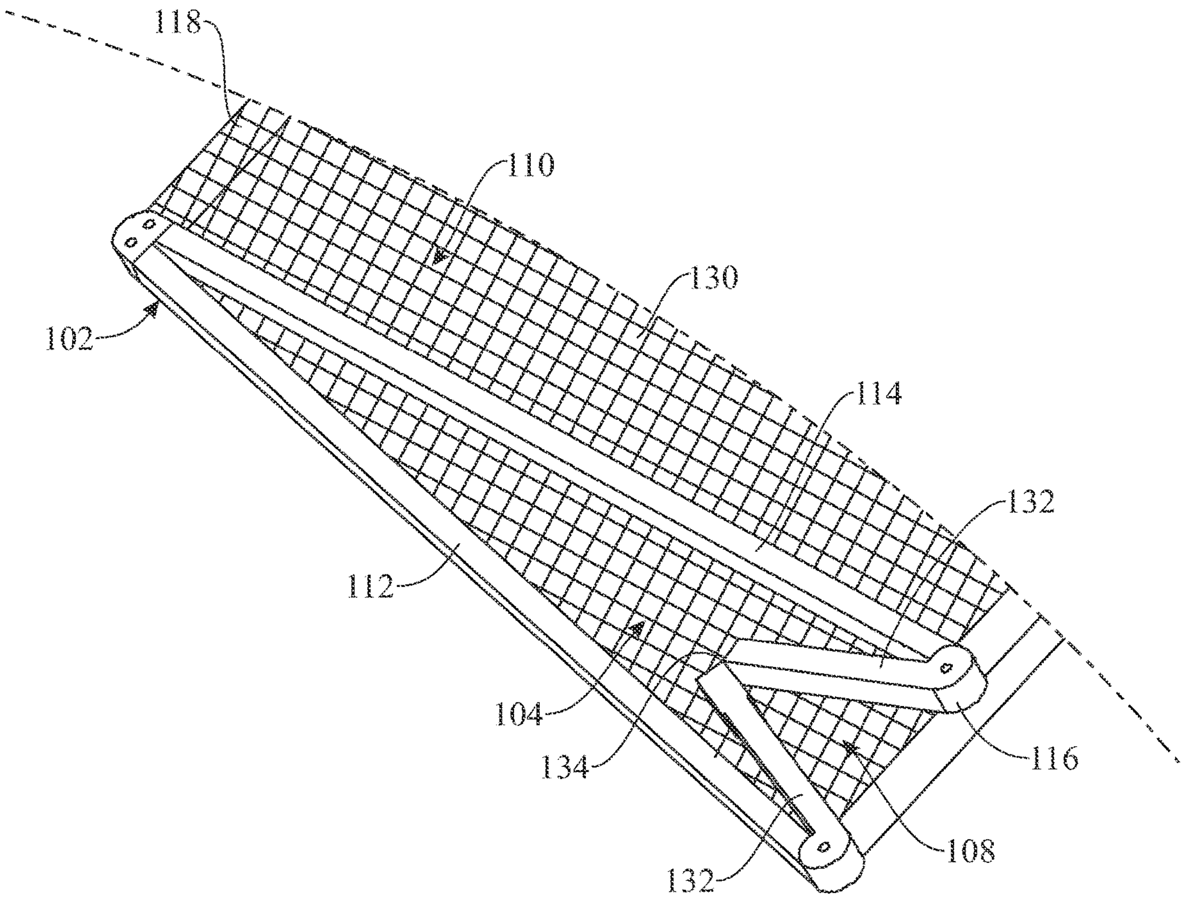
FIG. 5 presents a perspective, expanded view of a side of the device of FIG. 1, illustrating a pivoting of a front member thereof in accordance with a nonlimiting aspect of the invention.

In certain examples, the frame 102 may be configured to collapse for ease of transportation and/or storage. In such examples, the frame 102 may be collapsible such that a dimension between the lower and upper members 112 and 114 is decreased (FIG. 3), in some instances substantially to zero (FIG. 4), the height of the device 100 is reduced, and portions of the net 130 covering the lower and upper sides 108 and 110 may be substantially in contact with each other. In the figures, for example, the front members 116 are each an assembly of a pair of partial members 132 pivotally coupled to each other, in this instance, at a generally central hinge 134. The partial members 132 are each pivotally coupled to respective front ends of the lower and upper members 112 and 114. With this arrangement, the front members 116 are configured to pivot relative to each other and relative to the respective front ends of the lower and upper members 112 and 114 such that the front members 116 collapse into the respective left and right sides 104 and 106, as presented in FIG. 5. Since the front members 116 collapse inward and thereby decrease areas defining the left and right sides 104 and 106, the net 130 covering the left and right sides 104 and 106 is not required to stretch beyond the original boundaries of the left and right sides 104 and 106.

The device 100 provides for a method of collecting debris, such as leaves on a lawn, which includes locating the device 100 in a first position on the surface (e.g., the lawn) such that the lower side 108 is adjacent the surface and the upper side 110 is supported in an elevated position above the surface by the left and right sides 104 and 106. The debris may then be moved, such as by raking with a rake or blowing with a leaf blower, in a direction toward the device 100 such that the debris are received through the opening 126 and into the interior space 124. The generally rigid nature of the elongated members forming the frame 102, i.e., the lower members 112, upper members 114, front members 116, rear cross bar 118, and front lower and upper crossbars 120 and 122, allows the device 100 to maintain its shape during use, even if constructed with lightweight materials. If desired, the method may include relocating the device 100 to a second position on the surface with the debris retained within the interior space 124 and then moving additional debris in a direction toward the device 100 such that the debris are received through the opening 126 and into the interior space 124. This process can be performed multiple times to collect debris covering various locations on the surface. Relocation of the device 100 is facilitated by the frame 102 being made of discrete, generally rigid elongated elements, where the enclosure is instead mainly formed by a flexible, preferably lightweight net (net 130). In some examples, the method of collecting debris may include closing and/or sealing the opening 126 of the device 100 with the debris retained within the interior space 124, for example, to promote ease of transportation and/or prevent the debris from escaping the interior space 124 between uses of the device 100.

In certain examples, the method may include collapsing the frame 102. In some examples, collapsing the frame 102 may position portions of the net 130 covering the lower and upper sides 108 and 110 substantially in contact with each other. In the examples of the figures, collapsing the frame 102 includes pivoting the lower and upper members 112 and 114 of each of the left and right sides 104 and 106 relative to each other and pivoting the front members 116 of each of the left and right sides 104 and 106 relative to the lower and/or upper members 112 and 114 of the corresponding left and right sides 104 and 106. In addition, collapsing the frame 102 includes pivoting the partial members 132 of each of the left and right sides 104 and 106 relative to each other and relative to the respective second ends of the lower and upper members 112 and 114. In some examples, the front members 116 may collapse into the respective left and right sides 104 and 106 thereby decreasing areas defining the left and right sides 104 and 106.

The illustrations of FIGS. 7-18 show a debris containing device, hereinafter device 200, for receiving and retaining debris therewithin in accordance with a further embodiment of the present invention. With reference initially to FIGS. 1 and 2, similarly to the device 100 of FIGS. 1-6, the device 200 includes a net 210 and a frame 220. The net 210 is attachable to the frame 220. The frame 220, in turn, is made of a plurality of elongated members, which may be generally rigid or non-flexible, and collapsible, similarly as was heretofore described with reference to device 100. As with the device 100 of FIGS. 1-6, the device 200 is formed along a front-to-back, longitudinal direction x, a left-to-right, transverse direction y, and a vertical direction z, said directions forming an orthogonal axis set.

Figure 8:
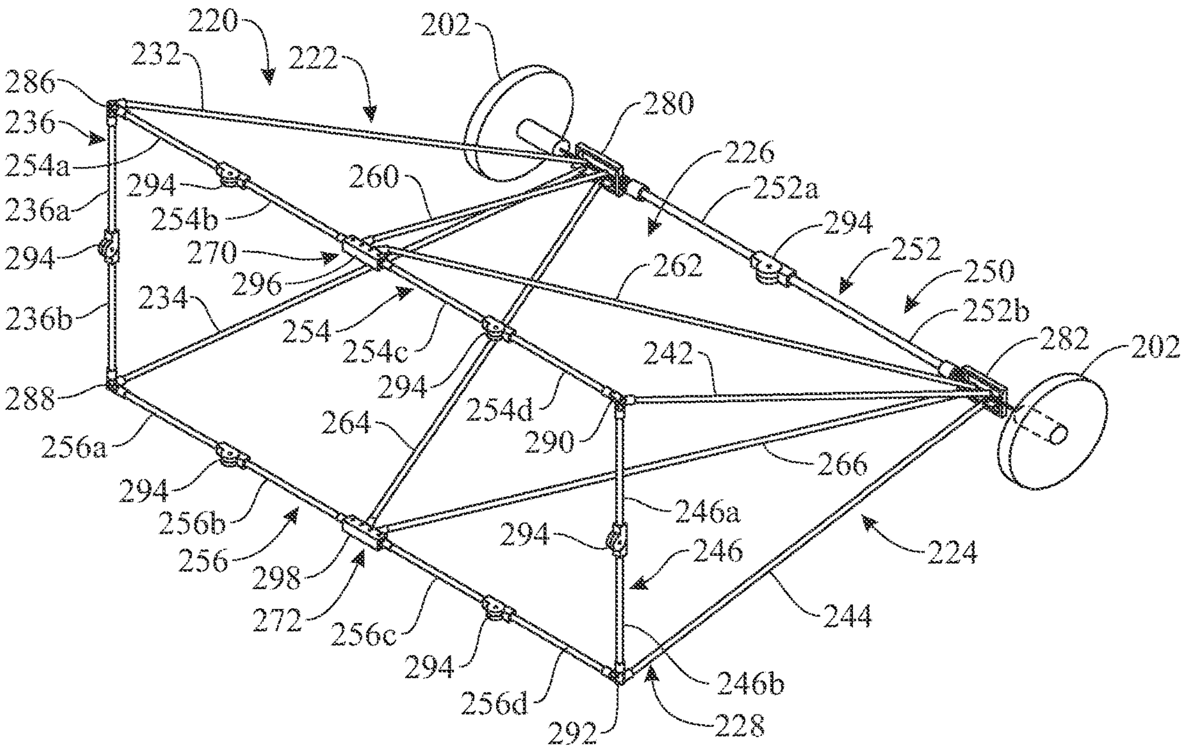
FIG. 8 presents a top, front perspective view of the frame of the device of FIG. 7, shown in the deployed configuration.
Figure 15:
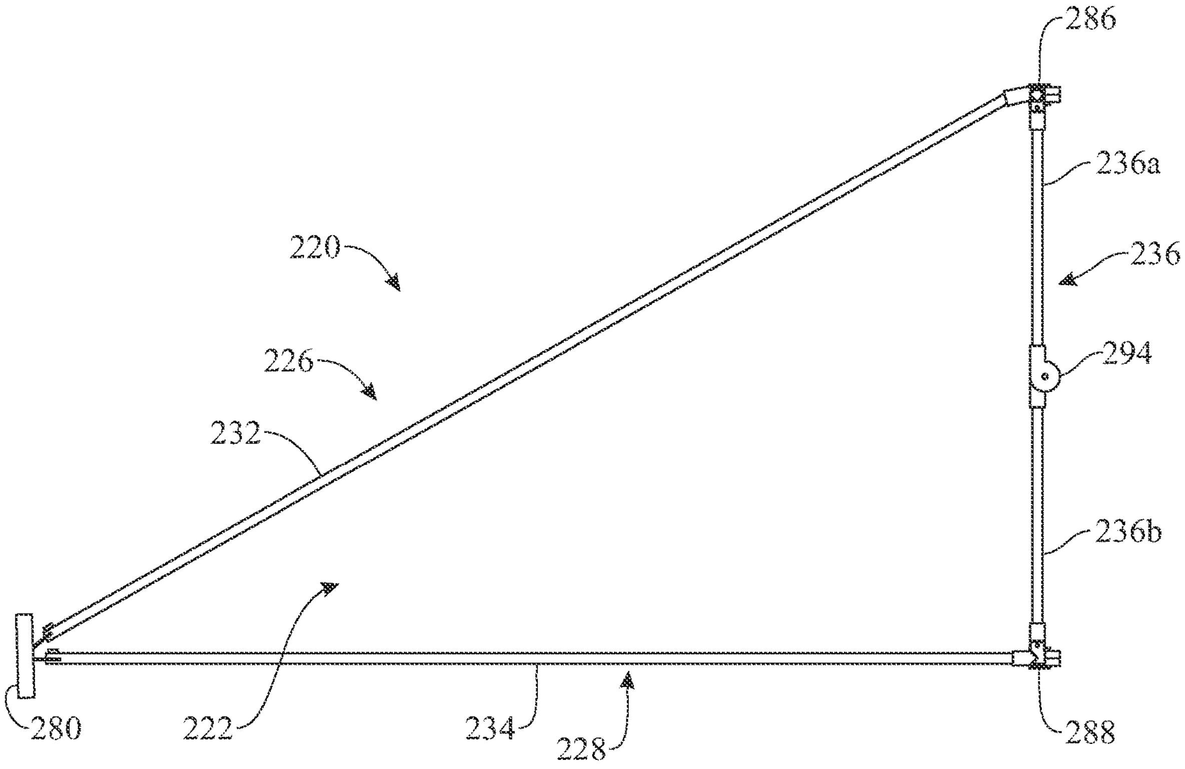
FIG. 15 presents a left side elevation view of the frame of FIGS. 7 and 8.

Similarly to the previous embodiment, the plurality of elongated members may include elongated members forming a generally triangular left side 222 of the frame 220, additional elongated members forming a generally triangular right side 224 of the frame 220, and additional elongated members or plurality of crossbars 250 interconnecting the left and right sides 222 and 224 of the frame 220 in a transversely-spaced-apart relationship to define a upper side 226 and a lower side 228 of the frame 220. More specifically, as with the previous embodiment and as best shown in FIGS. 8 and 15, the elongated members forming the left side 222 of the frame 220 may include an upper member 232, a lower member 234, and a front member 236. The upper and lower members 232 and 234 are pivotably connected to one another at respective rear ends thereof. In turn, the front member 236 is pivotably connected at opposite ends thereof to a front end of the upper member 232 and a front end of the lower member 234. The front member 236 is formed of, or comprises, at least two partial members 236*a*, 236*b* pivotably connected to one another enabling a collapsing of the front member 236; more specifically, the front member 236 shown herein includes two partial members 236*a*, 236*b*. Similarly, as also shown in FIG. 8, the elongated members forming the right side 224 of the frame 220 may include an upper member 242, a lower member 244, and a front member 246. The upper and lower members 242 and 244 are pivotably connected to one another at respective rear ends thereof. In turn, the front member 246 is pivotably connected at opposite ends thereof to a front end of the upper member 242 and a front end of the lower member 244. The front member 246 is formed of, or comprises, at least two partial members 246*a*, 246*b* pivotably connected to one another enabling a collapsing of the front member 246; more specifically, the front member 246 shown herein includes two partial members 246*a*, 246*b*.

As shown for instance in FIG. 8, similarly to the previous embodiment, the plurality of crossbars 250 of the present embodiment includes a rear crossbar 252, a front upper crossbar 254, and a front lower crossbar 256. The rear crossbar 252 extends from a rear end of the left side 222 of the frame 220 to a rear end of the right side of the frame 220. The front upper crossbar 254 extends from a front upper end of the left side 222 of the frame 220 to a front upper end of the right side of the frame 220. In turn, the front lower crossbar 256 extends from a front lower end of the left side 222 of the frame 220 to a front lower end of the right side of the frame 220. The rear crossbar 252, front upper crossbar 254, and upper members 232 and 242 may define the upper side 226 of the frame 220. The rear crossbar 252, front lower crossbar 256, and lower members 234 and 244 may define the lower side 228 of the frame 220.

Unlike the previous embodiment, however, the rear crossbar 252, front upper crossbar 254, and front lower crossbar 256 of the present embodiment are collapsible, for which each crossbar includes at least two partial members pivotably connected to one another enabling the collapsing of each crossbar. More specifically, the rear crossbar 252 specifically depicted herein includes two partial members 252*a* and 252*b* pivotably connected to one another enabling a collapsing of the rear crossbar 252. In turn, the front upper crossbar 254 includes first, second, third, and fourth partial members 254*a*, 254*b*, 254*c* and 254*d*, respectively, which are pivotably connected to one another enabling a collapsing of the front upper crossbar 254. Similarly, the front lower crossbar 256 includes first, second, third, and fourth partial members 256*a*, 256*b*, 256*c* and 256*d*, respectively, which are pivotably connected to one another enabling a collapsing of the front lower crossbar 256.

With continued reference to FIG. 8, the plurality of elongated members of the frame 220 of the present embodiment further includes an upper left intermediate member 260 and an upper right intermediate member 262. The upper left intermediate member 260 is pivotably connected to an intermediate—and more preferably central-point 270 of the front upper crossbar 254 and to a rear end of the left side 222. The upper right intermediate member 262 is pivotably connected to the intermediate point 270 of the front upper crossbar 254 and to a rear end of the right side 224. The first partial member 254*a* and the second partial member 254*b* of the front upper crossbar 254 are pivotably connected to one another enabling a collapsing of the front upper crossbar 254 between the front upper end of the left side 222 of the frame 220 and the intermediate point of the front upper crossbar 254. The third partial member 254*c* and the fourth partial members 254*d*, in turn, are pivotably connected to one another enabling a collapsing of the front upper crossbar 254 between the intermediate point of the front upper crossbar 254 and the front upper end of the right side of the frame 220.

Similarly, the plurality of elongated members further includes a lower left intermediate member 264 and a lower right intermediate member 266 at a lower side of the frame 220. The lower left intermediate member 264 is pivotably connected to an intermediate—and more preferably central-point 272 of the front lower crossbar 256 and to a rear end of the left side 222. The lower right intermediate member 266 is pivotably connected to the intermediate point 272 of the front lower crossbar 256 and to a rear end of the right side 224. The first partial member 256*a* and the second partial member 256*b* of the front lower crossbar 256 are pivotably connected to one another enabling a collapsing of the front lower crossbar 256 between the front lower end of the left side 222 of the frame 220 and the intermediate point 272 of the front lower crossbar 256. In turn, the third partial member 256*c* and the fourth partial members 256*d* are pivotably connected to one another enabling a collapsing of the front lower crossbar 256 between the intermediate point 272 of the front lower crossbar 256 and the front lower end of the right side of the frame 220.

Figure 9:
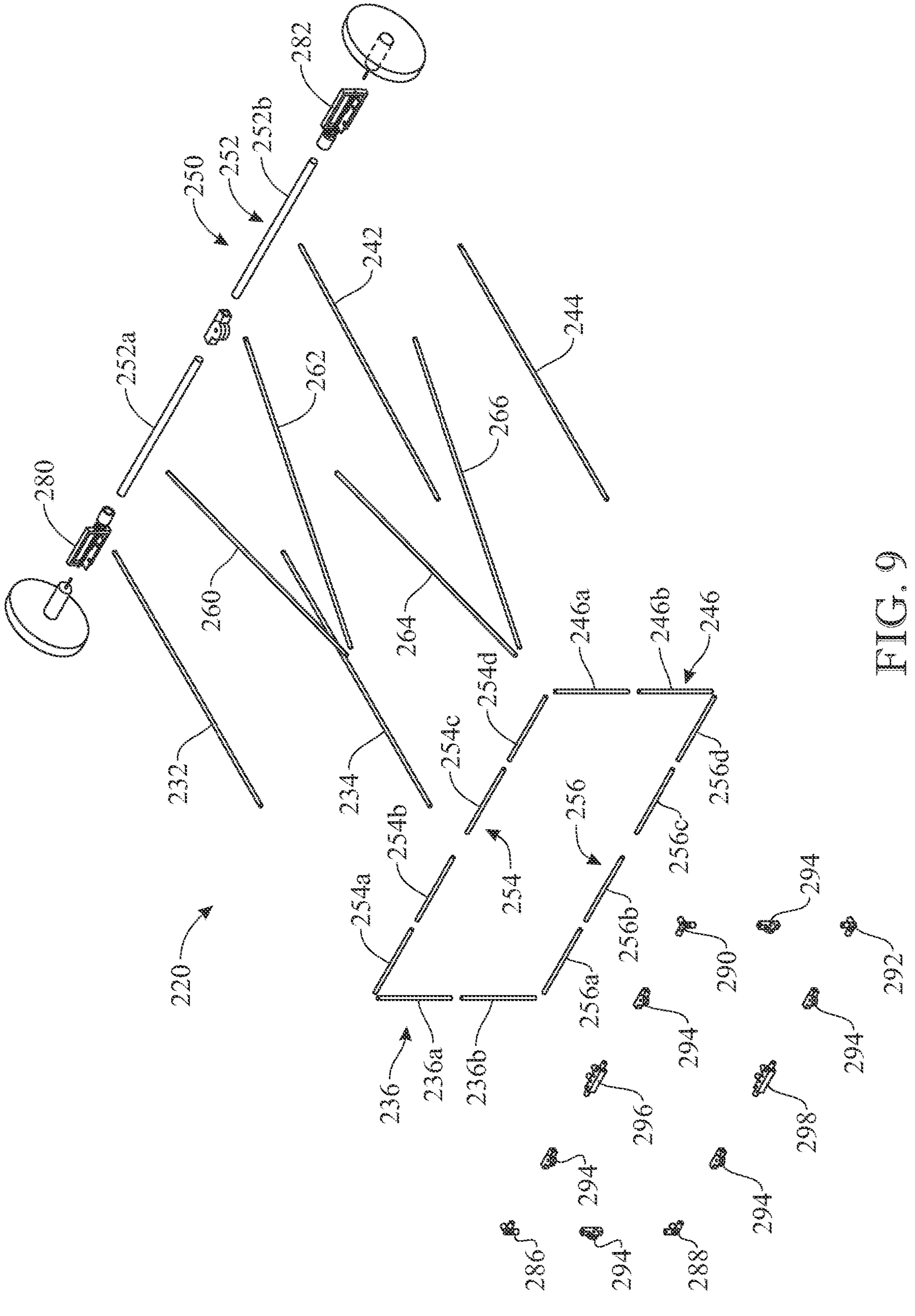
FIG. 9 presents an exploded, top front perspective view of the frame of FIG. 8.

With reference to FIGS. 8 and 9, the elongated members, and the partial members forming some of the elongated members, may be pivotably interconnected to one another by a plurality of articulated connectors. For example, the left side 222 includes a rear articulated connector 280 pivotably connecting the upper and lower members 232 and 234 of the left side 222 to one another. Similarly, the right side 224 includes a rear articulated connector 282 pivotably connecting the upper and lower members 242 and 244 of the left side 224 to one another. As shown in FIG. 8, the rear crossbar 252 extends from the rear articulated connector 280 of the left side 222 to the rear articulated connector 282 of the right side 224.

Figure 10:
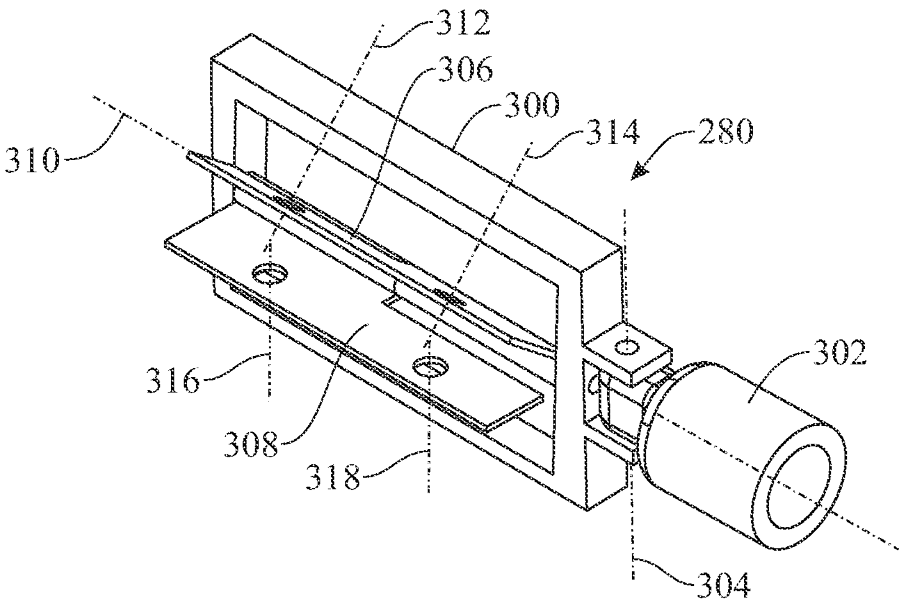
FIG. 10 presents a perspective view of a rear articulated connector of the frame of FIG. 8.
Figure 11:
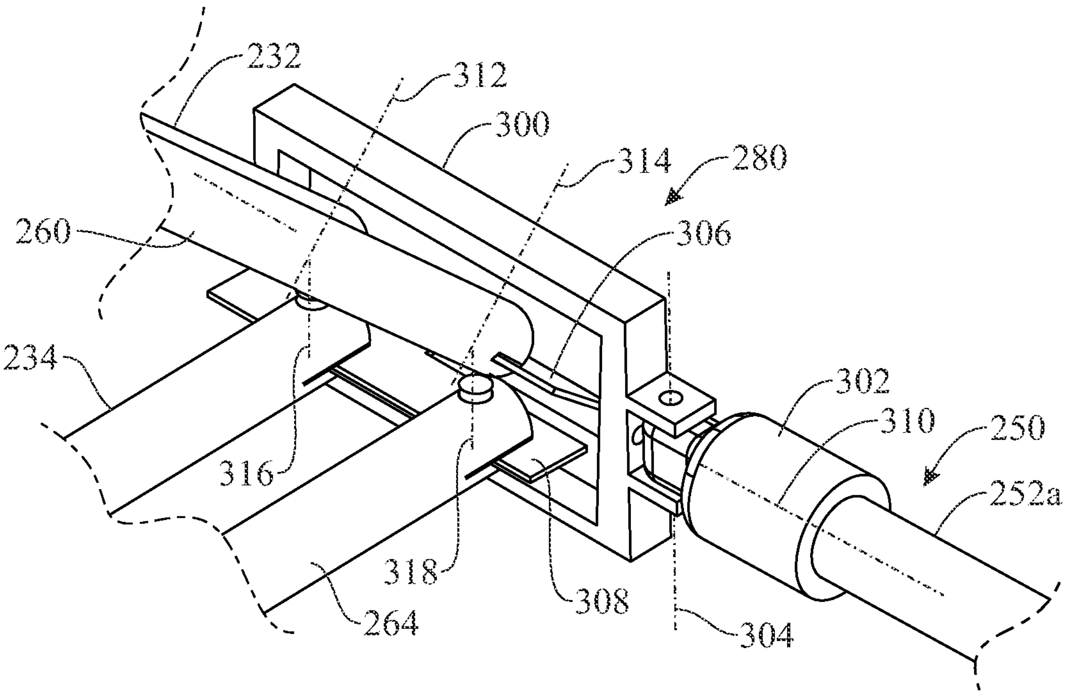
FIG. 11 presents a perspective view of the rear articulated connector of FIG. 10, further including corresponding elongated members of the frame pivotably attached to the rear articulated connector.

The illustrations of FIGS. 10 and 11 show an enlarged views of the rear articulated connector 280 of the left side 222, in accordance with an illustrative embodiment of the invention; it should be noted that the rear articulated connector 282 of the right side 224 may be symmetrical to the rear articulated connector 280. With reference to FIG. 10, the rear articulated connector 280 may include a main body 300. A tube connector 302 may be pivotably coupled to the main body 300 by a rotation axis 304; as shown in FIG. 11, the partial member 252*a* may be connected to the tube connector 302 and may thereby pivot about the rotation axis 304, which is generally perpendicular to the partial member 252*a* (e.g., vertical, as shown), facilitating a collapsing of the rear crossbar 252. First and second hinge plates 306 and 308 may be pivotably coupled to the main body 300 about a rotation axis 310 which is generally parallel to the partial member 252*a* when the rear crossbar 252 is extended or non-collapsed (FIGS. 8 and 11); rotation about the rotation axis 310 enables a vertical collapsing of the frame 220. As best shown in FIG. 11, the upper member 232 and the upper left intermediate member 260 may be pivotably attached to the first hinge plate 306 about respective rotation axes 312 and 314 and may independently pivot about the rotation axes 312 and 314 with respect to each other. Similarly, the lower member 234 and the lower left intermediate member 264 may be pivotably attached to the second hinge plate 308 about respective rotation axes 316 and 318 and may independently pivot about the rotation axes 316 and 318 with respect to each other. The rotation axes 312, 314, 316 and 318 may be generally perpendicular to the rotation axis 310, such that the pivoting of the different elongated members about the rotation axes 312, 314, 316 and 318 enables a generally horizontal collapsing of the frame 220. Each one of the upper member 232, upper left intermediate member 260, lower member 234 and lower left intermediate member 264 is therefore pivotable about a respective pair of rotation axes 310-312, 310-314, 310-316, and 310-318, enabling the frame 220 to collapse horizontally, vertically, or both.

With reference to FIGS. 8 and 9, additional articulated connectors may be provided at upper and lower front ends of the first and second sides 222 and 224 of the frame 220. Specifically, the left side 222 may include a front upper articulated connector 286 pivotably connecting the front end of the upper member 232 of the left side 222 to the front member 236 of the left side 222. Similarly, the right side 224 may include a front upper articulated connector 290 pivotably connecting the front end of the upper member 242 of the right side 224 to the front member 246 of the right side 224. The front upper crossbar 254 may extend from the front upper articulated connector 286 of the left side 222 to the front upper articulated connector 290 of the right side 224. Similarly, the left side 222 may include a front lower articulated connector 288 pivotably connecting the front end of the lower member 232 of the left side 222 to the front member 236 of the left side 222. Similarly, the right side 224 may include a front lower articulated connector 292 pivotably connecting the front end of the lower member 242 of the right side 224 to the front member 246 of the right side 224. The front lower crossbar 256 may extend from the front lower articulated connector 288 of the left side 222 to the front lower articulated connector 292 of the right side 224.

Figure 12:
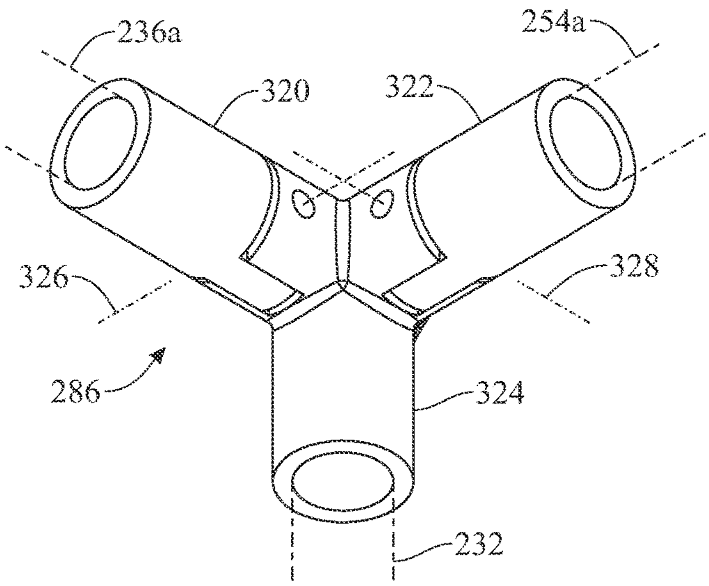
FIG. 12 presents a perspective view of a front upper articulated connector of the frame of FIG. 8.

The illustration of FIG. 12 shows an enlarged view of the front upper articulated connector 286, by way of example; it should be noted that articulated connectors 288, 290 and 292 may be constructed generally the same as the front upper articulated connector 286. With reference to FIG. 12, the front upper articulated connector 286 may include first, second, and third tube connectors 320, 322, and 324, respectively, which may be pivotable with respect to one another about a first rotation axis 326 and a second rotation axis 328 arranged in a different, preferably generally perpendicular direction with respect to the first rotation axis 326. The upper member 232 may be coupled with the third tube connector 324. The partial member 236*a* of the front member 236 may be coupled with the first tube connector 320 and may pivot about the first rotation axis 326 with respect to the second and third tube connectors 322, 324 enabling a vertical collapsing of the frame 220. In turn, the partial member 254*a* of the front upper crossbar 254 may be coupled with the second tube connector 322 and may pivot about the second rotation axis 328 with respect to the first and third tube connectors 320, 324 enabling a horizontal collapsing of the frame 220. Independent pivoting about the first and second rotation axes 326 and 328 allows the frame 200 to selectively collapse horizontally, vertically, or both.

With reference again to FIGS. 8 and 9, additional articulated connectors may be provided at the intermediate points 270 and 272 of the front upper and lower crossbars 254 and 256, respectively. Specifically, the front upper crossbar 254 may include an intermediate articulated connector 296 pivotably connected to the upper left intermediate member 260, the upper right intermediate member 262, the second partial member 254*b* of the front upper crossbar 254, and the third partial member 254*c* of the front upper crossbar 254. Similarly, the front lower crossbar 256 may include an intermediate articulated connector 298 pivotably connected to the lower left intermediate member 264, the lower right intermediate member 266, the second partial member 256*b* of the front lower crossbar 256, and the third partial member 256*c* of the front lower crossbar 256.

Figure 13:
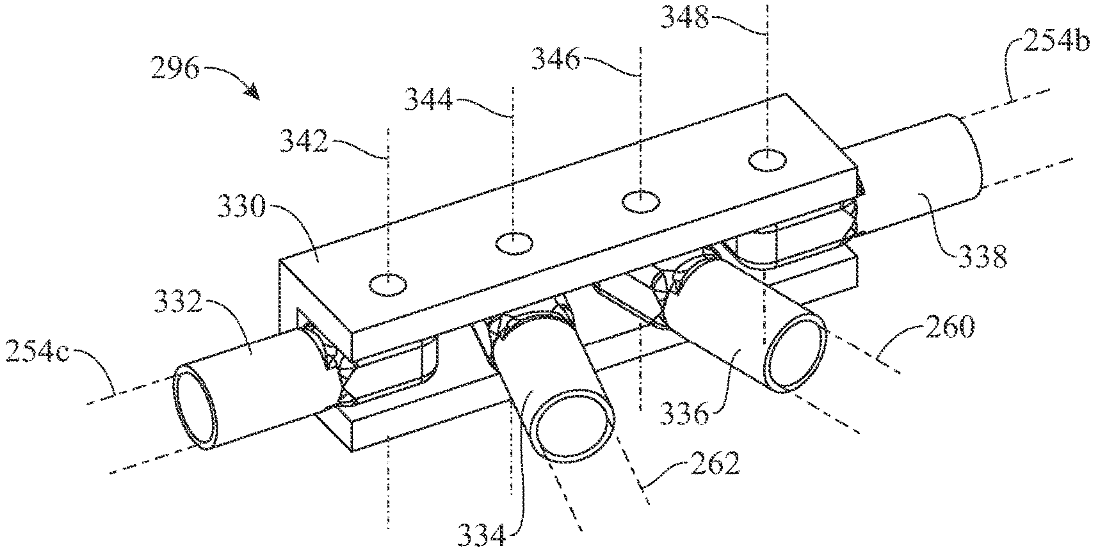
FIG. 13 presents a perspective view of an intermediate articulated connector of the frame of FIG. 8.

The illustration of FIG. 13 shows an enlarged view of the intermediate articulated connector 296; it should be noted that the intermediate articulated connector 298 may be constructed the same as the intermediate articulated connector 296. With reference to FIG. 13, the intermediate articulated connector 296 comprises a main body 330 and first, second, third and fourth tube connectors 332, 334, 336, and 338 pivotably connected to the main body 330 about respective rotation axes 342, 344, 346, and 348. The rotation axes 342, 344, 346, and 348 may be generally parallel to one another and generally perpendicular to the respective axial directions of the first, second, third and fourth tube connectors 332, 334, 336, and 338, as shown, and thus generally perpendicular to the respective elongated members connected thereto. More specifically, the partial members 254*c* and 254*b* of the front upper crossbar 254 may be coupled with the first and fourth tube connectors 332 and 338, respectively, and the upper right and upper left intermediate members 262 and 260 may be coupled with the second and third tube connectors 334 and 336, respectively. Rotation of these elongated members with respect to the rotation axes 342-348 enables a horizontal collapsing of the frame 220.

Figure 14:
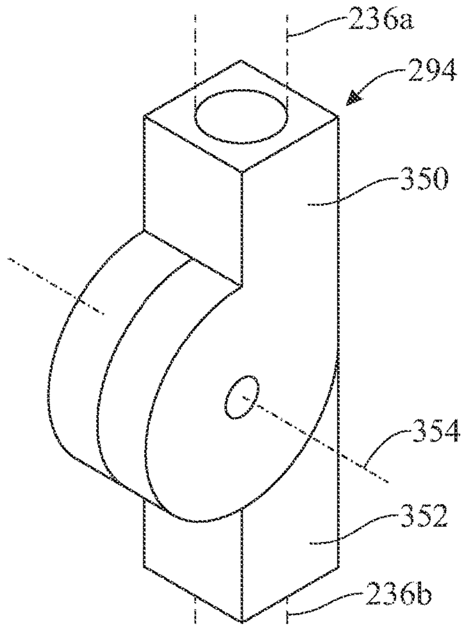
FIG. 14 presents a perspective view of a hinge type, articulated connector of the frame of FIG. 8.

Finally, hinge type, articulated connectors 294 similar to the hinges 134 of the previous embodiment may be provided at additional intermediate points of the frame 220, enabling a horizontal or vertical collapsing of the frame 220. The illustration of FIG. 14 shows an enlarged view of a hinge type, articulated connector 294; as shown, the articulated connector 294 may include first and second tube connectors 350 and 352 which are pivotably attached to one another about a rotation axis 354. In one example, the first and second tube connectors 350 and 352 may be attached to the partial members 236*a* and 236*b* of the front member 236, respectively, enabling a vertical collapsing of the front member 236. In another example, the first and second partial members 245*a* and 254*b* of the front upper crossbar 254 may be attached to the first and second tube connectors 350 and 352, respectively, enabling a horizontal collapsing of the front upper crossbar 254.

Referring back to FIG. 7, similarly to the embodiment of FIGS. 1-6, in some embodiments one or more of the elongated members of the frame 220 of the device 200 of the present embodiment may be entirely or partially within a sleeve 212 secured to the net 210. In some examples, the elongated members may be releasably received within the sleeves 232 (e.g., with a hook-and-loop fasteners) in a manner that allows the net 210 to be decoupled from the frame 220. Alternatively or additionally, the net 210 may include a flap 214, which may selectively adopt an open position and a closed position as described in greater detail hereinafter. In some embodiments, the flap 214 may be pivotable with respect to the remainder of the net 210 between the open and closed positions. Preferably, the flap 214 may be pivotable about a pivot axis arranged at a bottom of the flap 214, as shown and indicated by arrow A, allowing the flap 214 to pivot downward from the open position to the closed position, assisted by gravity.

Figure 7:
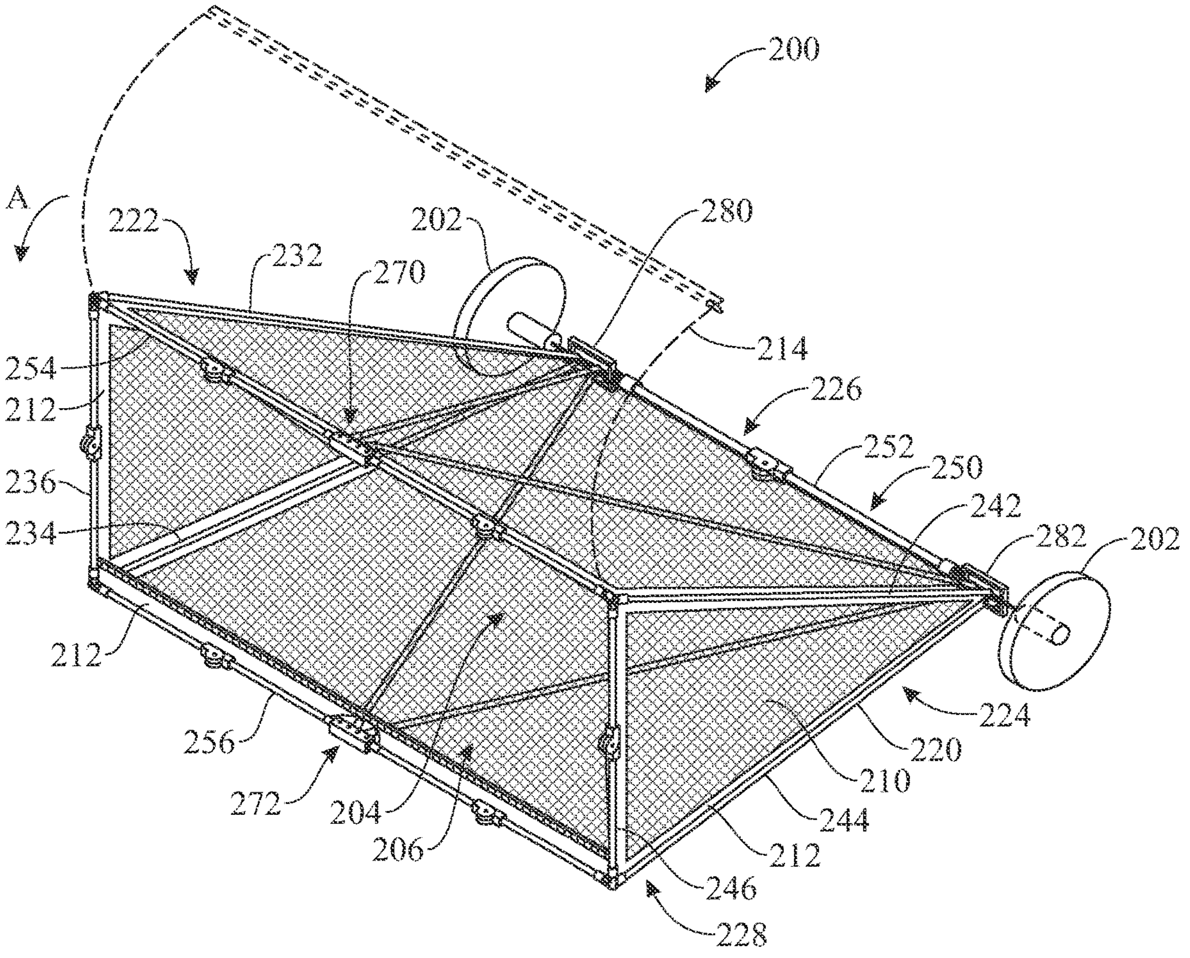
FIG. 7 presents a top, front perspective view of a device for collecting debris in accordance with a second embodiment of the present invention, the device including a frame and a net, the device shown in a deployed configuration with a flap of the net in an open position, the open flap revealing a front opening providing access to an interior space of the device.

With continued reference to FIG. 7, in some embodiments, the device 200 may be provided with a set of wheels 202. For instance, the set of wheels 202 may include, or consist of, a pair of wheels 202, as shown. The pair of wheels 202 may be located at opposite rear ends of the device 200. For example, the pair of wheels 202 may be rotatably attached to the rear articulated connectors 280. The set of wheels 202 may facilitate transporting the device 200 along a surface or ground by rolling the device 200 thereon.

An illustrative method of operation of the device 200 will now be described with reference initially to FIGS. 8 and 15. As with the embodiment of FIGS. 1-6, the left and right sides 222 and 224 of the frame 220 of the device 200 are selectively movable between an extended configuration, shown in FIGS. 8 and 15, and a collapsed configuration, shown in FIG. 16. With reference to the left side 222, in the extended configuration (FIGS. 8 and 15), the partial members 236*a* and 236*b* of the front member 236 of the left side 222 are pivoted away from one another about the hinge type, articulated connector 294, such that the partial members 236*a* and 236*b* generally form 180 degrees with one another and the front member 236 of the left side 222 is non-collapsed. Additionally, the upper and lower members 222 and 234 of the left side 222 are pivoted away from one another by means of the rear articulated connector 280. The pivotable, front upper and lower articulated connectors 286 and 288 maintain the partial members 236*a* and 236*b* connected to the upper and lower members 232 and 234, respectively, as the members 236*a*, 236*b*, 232, 234 pivot. In the extended configuration, as shown, the left side 222 has a generally triangular shape, as does the right side 224, which adopts a respective extended configuration in an analogous manner. In turn, in the collapsed configuration of the left side 222 (FIG. 16), the front member 236 is collapsed as enabled by articulated connectors 286, 288, and 294, and the upper and lower members 232 and 234 are pivoted towards each other as enabled by articulated connectors 280, 286 and 288. The expanding and collapsing of the right side 224 is analogous to that of the left side 222: in the extended configuration of the right side 224, the front member 246 is non-collapsed and the upper and lower members 242 and 244 are pivoted away from one another; in turn, in the collapsed configuration of the right side 224, the front member 246 is collapsed and the upper and lower members 242 and 244 are pivoted towards each other. By expanding or collapsing the first and second sides 222 and 224 with the device 200 positioned as shown in the figures (with the lower side 228 facing the ground and the upper side 226 facing upward), the device 200 is vertically expanded or collapsed, respectively.

As shown in FIGS. 7 and 8, the device 200 may adopt a deployed configuration, in which the left and right sides 222 and 224 are arranged in the extended configuration, the upper and lower sides 226 and 228 thus arranged away from one another, and the plurality of crossbars 250 maintain the left and right sides 222 and 224 transversely spaced apart from one another. In some embodiments, the plurality of crossbars 250 may be collapsible, as heretofore described. In such embodiments, in the deployed configuration of the device 200, shown in FIG. 7, the plurality of crossbars 250 may be extended or non-collapsed. Preferably, the partial members forming each crossbar may form 180 degrees with one another, such that the crossbars 250 are generally straight.

In this deployed configuration of the device 200, as best shown in FIG. 7, the frame 220 and the net 210 form an enclosure defining an interior space 204. The enclosure has a front opening 206 which communicates with the interior space 204, enabling the insertion and removal of debris into and from the interior space 204, respectively. In some embodiments, as heretofore described, the flap 214 of the net 210 may be selectively opened and closed to expose or block the front opening 206, allowing or preventing access to the interior space 204 through the front opening 206.

Figure 16:
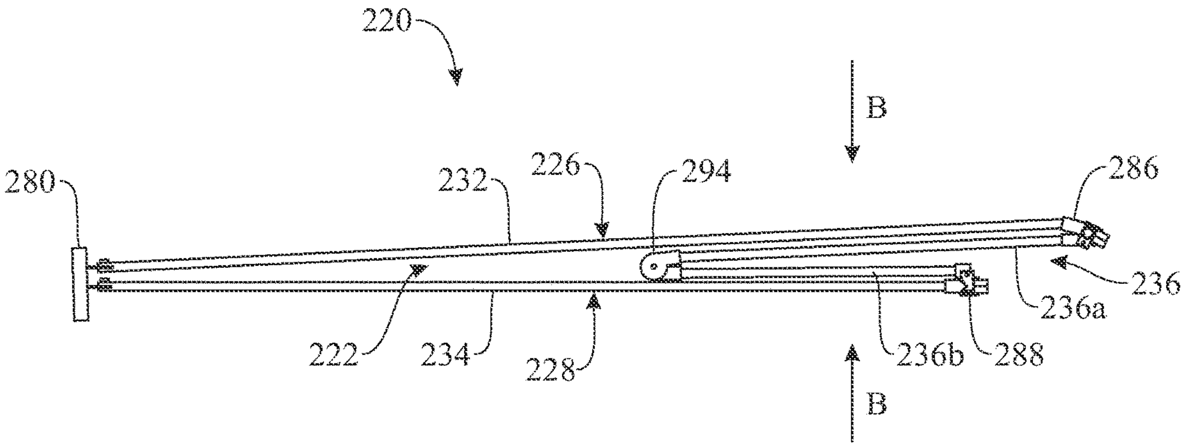
FIG. 16 presents a left side elevation view, similar to FIG. 15, showing the frame in a vertically-collapsed configuration.
Figure 17:
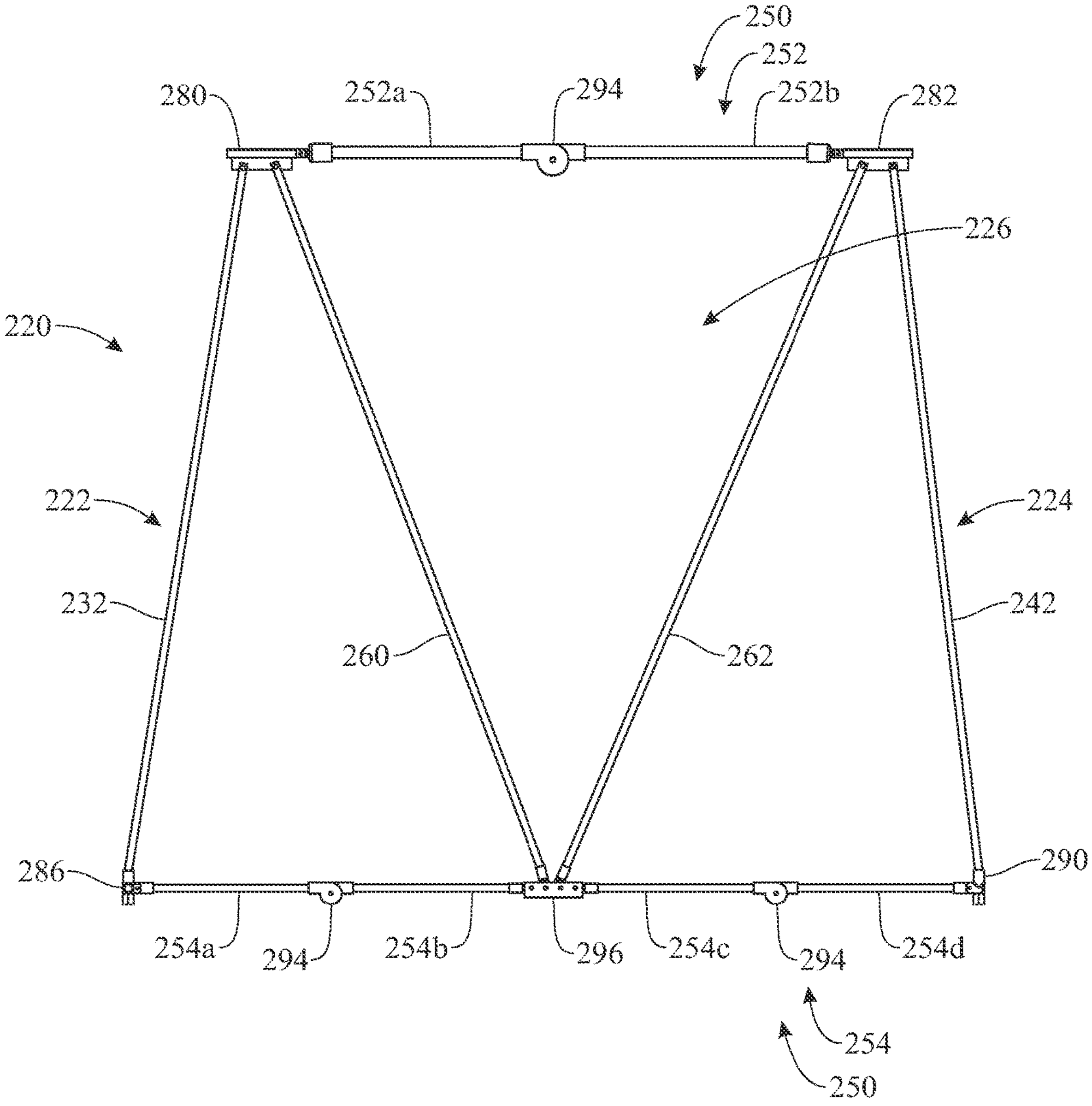
FIG. 17 presents a top plan view of the frame of FIGS. 7 and 8.

From the deployed configuration of the device 200, as shown in FIG. 16, the device 200 may be vertically collapsed as heretofore described (i.e. by collapsing the first and second sides 222 and 224), as indicated by arrows B. In the vertically-collapsed configuration of the device 200, shown in FIG. 15, the device 200 has a smaller height than in the deployed configuration (FIG. 7). Furthermore, the net 210 is collapsed and the enclosure front opening 206, which extends generally from the front upper crossbar 254 to the front lower crossbar 256, is smaller in height with respect to the deployed configuration of FIG. 7.

Figure 18:
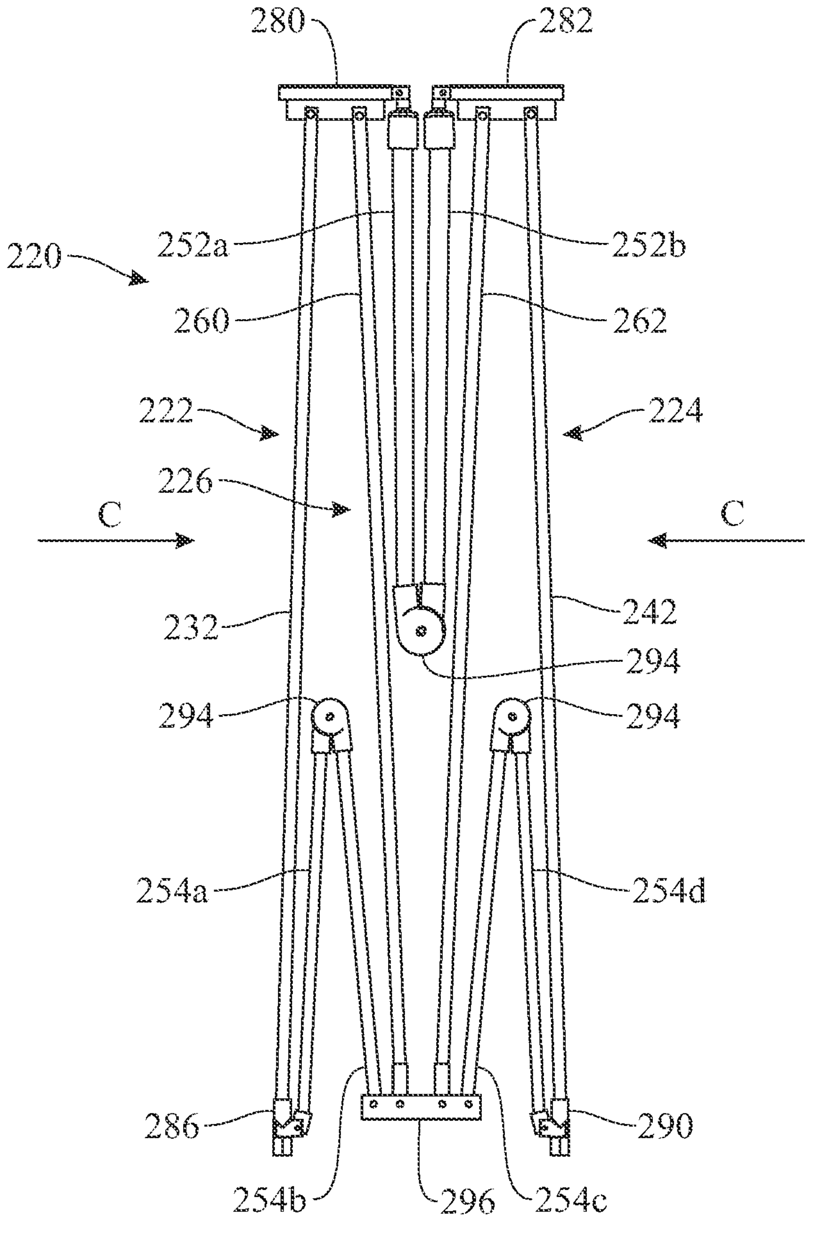
FIG. 18 presents a top plan view, similar to FIG. 17, showing the frame in a horizontally-collapsed configuration.

In some embodiments, as described heretofore, the plurality of crossbars 250 may be collapsible. In such embodiments, the device 200 is configured to further adopt a horizontally-collapsed configuration, shown for instance in FIG. 18. In the horizontally-collapsed configuration of the device 200, the plurality of crossbars 250 are collapsed as indicated by arrows C and enabled by the rear articulated connectors 280, 282, front upper and lower articulated connectors 286, 288, 290, 292, intermediate articulated connectors 296, 298 and corresponding hinge type, articulated connector(s) 294 at each crossbar 252, 254, 256. When collapsing the plurality of crossbars 250, the upper left and right intermediate members 260, 262 pivot towards one another as enabled by articulated connectors 280, 282 and 296, and the lower left and right intermediate members 264, 266 pivot towards one another as enabled by articulated connectors 280, 282 and 298. As shown in FIG. 18, in the horizontally-collapsed configuration of the device 200, the left and right sides 222 and 224 are arranged closer to one another with respect to the deployed configuration (FIG. 17), and the device 200 has a smaller width with respect to the deployed configuration. Additionally, the net 210 is collapsed and the enclosure front opening 206, which may extend generally from the front member 236 of the left side 222 to the front member 246 of the right side 224, is smaller in width with respect to the deployed configuration of FIG. 7.

In some embodiments, the operator may choose to collapse the device 200 horizontally, vertically, or both. When configuring the device 200 to simultaneously adopt the horizontally-collapsed configuration and the vertically-collapsed configuration, the total volumetric space occupied by the device 200 may be minimal, thereby facilitating storage and transportation. To achieve the simultaneous, horizontally- and vertically-collapsed configuration, initially, the device 200 may be collapsed vertically from the deployed position of FIG. 7, and thereafter collapsed horizontally. Alternatively, the device 200 may initially be collapsed horizontally from the deployed position of FIG. 7, and thereafter collapsed vertically. In yet another example, the operator may combine both collapsing actions at once.

Alternative embodiments are contemplated in addition to the embodiments shown and/or described herein. For example, the frame may include additional elongated members to further reinforce the device and/or provide additional functionality. Other structural aspects in addition to those presented in the figures may also be included. For example, the device may include one or more handles to promote ease of transporting the device.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A device for collecting debris, the device comprising:

a frame comprising:

left and right sides, wherein each one of the left and right sides comprises elongated, respective upper, lower, and front members, wherein the upper and lower members are pivotably connected to one another at respective rear ends thereof, and the front member is pivotably connected to respective front ends of the upper and lower members, wherein the front member is formed of at least two partial members pivotably connected to one another enabling a collapsing of the front member, said each one of the left and right sides selectively movable between an extended configuration in which the front member is non-collapsed and the upper and lower members are pivoted away from one another and a collapsed configuration in which the front member is collapsed and the upper and lower members are pivoted towards each other, and a plurality of crossbars extending from the left side to the right side; and a net attachable to the frame; wherein the device is configured to selectively adopt:

a deployed configuration, in which the left and right sides are arranged in the extended configuration and maintained spaced apart from one another by the plurality of crossbars, and further in which the frame and the net form an enclosure defining an interior space, the enclosure comprising a front opening enabling an insertion of debris into the interior space, and a vertically-collapsed configuration, in which the left and right sides are arranged in the collapsed configuration, and the front opening has a reduced height with respect to the deployed configuration.

2. The device of claim 1, wherein said each one of the left and right sides has a generally triangular shape when arranged in the extended configuration, said generally triangular shape defined by the respective upper, lower and front members of said each one of the left and right sides.

3. The device of claim 1, wherein the plurality of crossbars comprises a rear crossbar, extending from a rear end of the left side of the frame to a rear end of the right side of the frame.

4. The device of claim 3, wherein said each one of the left and right sides comprises a respective, rear articulated connector pivotably connecting the upper and lower members of said each one of the left and right sides to one another, and further wherein the rear crossbar extends from the rear articulated connector of the left side to the rear articulated connector of the right side.

5. The device of claim 3, wherein the rear crossbar is formed of at least two partial members pivotably connected to one another enabling a collapsing of the rear crossbar.

6. The device of claim 1, wherein the plurality of crossbars comprises a front upper crossbar, extending from a front upper end of the left side of the frame to a front upper end of the right side of the frame.

7. The device of claim 6, wherein said each one of the left and right sides comprises a respective, front upper articulated connector pivotably connecting the front end of the upper member of said each one of the left and right sides to the front member of said each one of the left and right sides, and further wherein the front upper crossbar extends from the front upper articulated connector of the left side to the front upper articulated connector of the right side.

8. The device of claim 6, wherein the front upper crossbar is formed of at least two partial members pivotably connected to one another enabling a collapsing of the front upper crossbar.

9. The device of claim 8, wherein the frame further comprises an upper left intermediate member and an upper right intermediate member pivotably connected to an intermediate point of the front upper crossbar and pivotably connected to a rear end of the left side and a rear end of the right side, respectively, the at least two partial members of the front upper crossbar comprising a first set of partial members pivotably connected to one another enabling a collapsing of the front upper crossbar between the front upper end of the left side of the frame and the intermediate point of the front upper crossbar, the at least two partial members of the front upper crossbar further comprising a second set of partial members pivotably connected to one another enabling a collapsing of the front upper crossbar between the intermediate point of the front upper crossbar and the front upper end of the right side of the frame.

10. The device of claim 9, wherein the front upper crossbar comprises an intermediate articulated connector pivotably connected to the upper left intermediate member, the upper right intermediate member, a rightmost partial member of the first set of partial members and a leftmost partial member of the second set of partial members.

11. The device of claim 1, wherein the plurality of crossbars comprises a front lower crossbar, extending from a front lower end of the left side of the frame to a front lower end of the right side of the frame.

12. The device of claim 11, wherein said each one of the left and right sides comprises a respective, lower articulated connector pivotably connecting the front end of the lower member of said each one of the left and right sides to the front member of said each one of the left and right sides, and further wherein the front lor crossbar extends from the lower articulated connector of the left side to the lower articulated connector of the right side.

13. The device of claim 11, wherein the front lower crossbar is formed of at least two partial members pivotably connected to one another enabling a collapsing of the front lower crossbar.

14. The device of claim 11, wherein the frame further comprises a lower left intermediate member and a lower right intermediate member pivotably connected to an intermediate point of the front lower crossbar and pivotably connected to a rear end of the left side and a rear end of the right side, respectively, the at least two partial members of the front lower crossbar comprising two or more partial members pivotably connected to one another enabling a collapsing of the front lower crossbar between the front lower end of the left side of the frame and the intermediate point of the front lower crossbar, the at least two partial members of the front lower crossbar further comprising two or more additional partial front members pivotably connected to one another enabling a collapsing of the front lower crossbar between the intermediate point of the front lower crossbar and the front lower end of the right side of the frame.

15. The device of claim 14, wherein the front lower crossbar comprises an intermediate articulated connector pivotably connected to the lower left intermediate member, the lower right intermediate member, a rightmost partial member of the first set of partial members and a leftmost partial member of the second set of partial members.

16. The device of claim 1, wherein the plurality of crossbars are collapsible, and further wherein:

in the deployed configuration, the plurality of crossbars are non-collapsed; and further wherein the device is configured to further adopt a horizontally-collapsed configuration, in which the plurality of crossbars are collapsed, and the left and right sides are arranged closer to one another with respect to the deployed configuration, such that the device has a reduced width with respect to the deployed configuration.

17. The device of claim 16, wherein the device is simultaneously positionable in both the vertically-collapsed and horizontally-collapsed configurations.

18. The device of claim 1, wherein the net comprises a flap, wherein, when the device is arranged in the deployed configuration the flap is selectively positionable in:

a closed position, in which the flap covers the front opening, and an open position, in which the flap is moved away from the front opening, exposing the front opening.

19. A device for collecting debris, the device comprising:

a frame comprising:

left and right sides, wherein each one of the left and right sides comprises elongated, respective upper, lower, and front members, wherein the upper and lower members are pivotably connected to one another at respective rear ends thereof, and the front member is pivotably connected to respective front ends of the upper and lower members, wherein the front member is formed of at least two partial members pivotably connected to one another enabling a collapsing of the front member, said each one of the left and right sides selectively movable between an extended configuration in which the front member is non-collapsed and the upper and lower members are pivoted away from one another, and further in which said each one of the left and right sides has a generally triangular shape defined by the respective upper, lower and front members of said each one of the left and right sides, and a collapsed configuration in which the front member is collapsed and the upper and lower members are pivoted towards each other, and a plurality of crossbars extending from the left side to the right side; and a net attachable to the frame, the net comprising a flap; wherein the device is configured to selectively adopt:

a deployed configuration, in which the left and right sides are arranged in the extended configuration and maintained spaced apart from one another by the plurality of crossbars, and further in which the frame and the net form an enclosure defining an interior space, the enclosure comprising a front opening enabling an insertion of debris into the interior space, and further in which the flap is selectively positionable in a closed position in which the flap covers the front opening and an open position in which the flap is moved away from the front opening exposing the front opening; and a vertically-collapsed configuration, in which the left and right sides are arranged in the collapsed configuration, and the front opening has a reduced height with respect to the deployed configuration.

20. A device for collecting debris, the device comprising:

a frame comprising:

left and right sides, wherein each one of the left and right sides comprises elongated, respective upper, lower, and front members, wherein the upper and lower members are pivotably connected to one another at respective rear ends thereof, and the front member is pivotably connected to respective front ends of the upper and lower members, wherein the front member is formed of at least two partial members pivotably connected to one another enabling a collapsing of the front member, said each one of the left and right sides selectively movable between an extended configuration in which the front member is non-collapsed and the upper and lower members are pivoted away from one another, and further in which said each one of the left and right sides has a generally triangular shape defined by the respective upper, lower and front members of said each one of the left and right sides, and a collapsed configuration in which the front member is collapsed and the upper and lower members are pivoted towards each other, and a plurality of crossbars extending from the left side to the right side, the plurality of crossbars comprising a rear crossbar, a front upper crossbar, and a front lower crossbar, wherein the rear crossbar extends from a rear end of the left side of the frame to a rear end of the right side of the frame, wherein the front upper crossbar extends from a front upper end of the left side of the frame to a front upper end of the right side of the frame, and wherein the front lower crossbar extends from a front lower end of the left side of the frame to a front lower end of the right side of the frame; and a net attachable to the frame, the net comprising a flap; wherein the device is configured to selectively adopt:

a deployed configuration, in which the left and right sides are arranged in the extended configuration and maintained spaced apart from one another by the plurality of crossbars, and further in which the frame and the net form an enclosure defining an interior space, the enclosure comprising a front opening enabling an insertion of debris into the interior space, the opening arranged between the front upper crossbar, the front lower crossbar, the front member of the left side, and the front member of the right side, and further in which the flap is selectively positionable in a closed position in which the flap covers the front opening and an open position in which the flap is moved away from the front opening exposing the front opening; and a vertically-collapsed configuration, in which the left and right sides are arranged in the collapsed configuration, and the front opening has a reduced height with respect to the deployed configuration.

* * * * *